(No Model.)

G. JORDAN.
APPARATUS FOR DISTILLING ALCOHOL AND OTHER VOLATILE SUBSTANCES.

No. 358,615. Patented Mar. 1, 1887.

WITNESSES:
A. Schehl.
Martin Petry.

INVENTOR
George Jordan
BY
Goepel & Raegener
ATTORNEYS.

UNITED STATES PATENT OFFICE.

GEORGE JORDAN, OF NEW YORK, N. Y.

APPARATUS FOR DISTILLING ALCOHOL AND OTHER VOLATILE SUBSTANCES.

SPECIFICATION forming part of Letters Patent No. 358,615, dated March 1, 1887.

Application filed May 11, 1886. Serial No. 201,826. (No model.)

*To all whom it may concern:*

Be it known that I, GEORGE JORDAN, of the city, county, and State of New York, have invented certain new and useful Improvements in Apparatus for Distilling Alcohol and other Volatile Substances, of which the following is a specification.

This invention relates to an improved method of distilling alcohol and other volatile substances in a quick and effective manner; and the invention consists, first, of a method of distilling alcohol and other volatile substances by exposing the same in a closed chamber in thin layers to a temperature above the boiling temperature of the alcohol and condensing the vapors; and secondly, of an apparatus which comprises the following elements: a closed casing, a tank for the substances to be distilled, an endless rotating belt moved by suitable rollers and passing through said tank, and a condenser connected to the casing and cooled by a suitable medium so as to condense the vapors and conduct them off by means of collecting-pipes that communicate with openings at the lower part of the condenser-sections.

Figure 1:
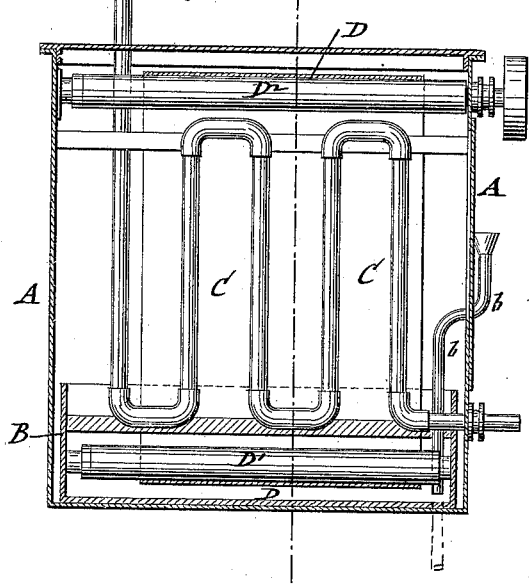
Figure 2:
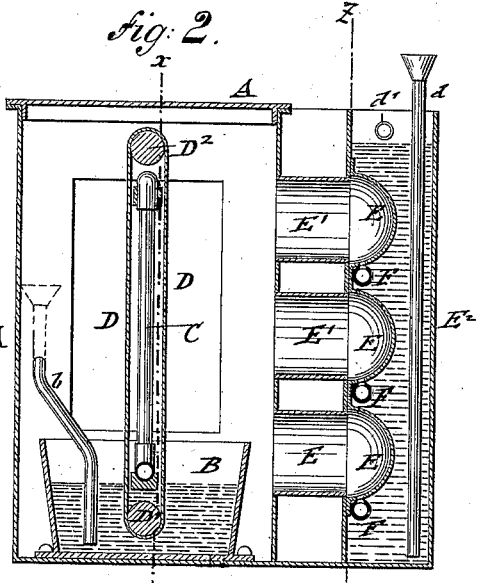
Figure 3:
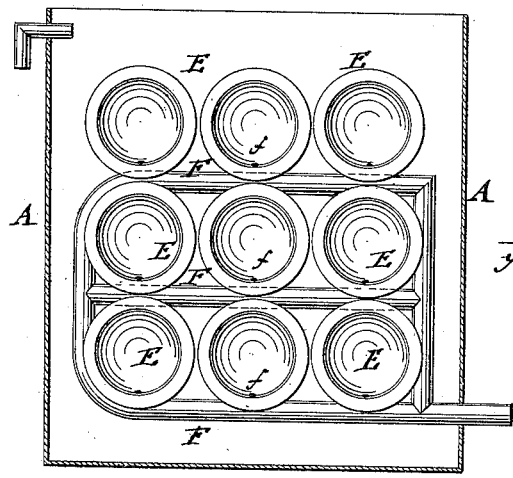
Figure 4:
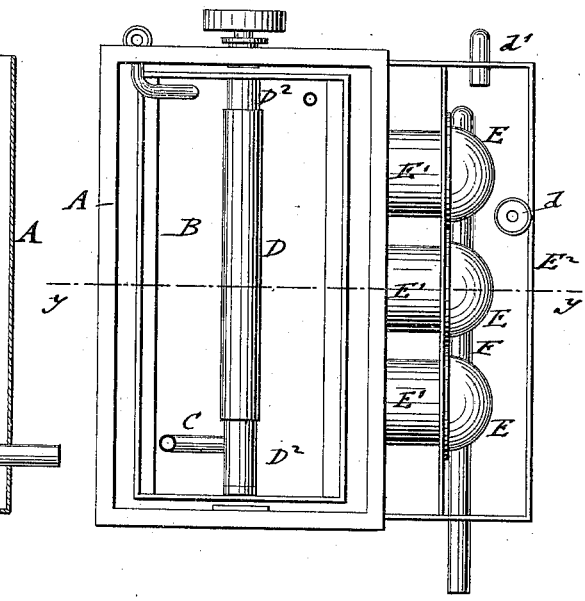

In the accompanying drawings, Figure 1 represents a vertical longitudinal section on line $x\ x$, Fig. 2, of my improved apparatus for distilling alcohol and other volatile substances. Fig. 2 is a vertical transverse section on line $y\ y$, Fig. 4. Fig. 3 is a vertical longitudinal section on line $z\ z$, Fig. 2; and Fig. 4 is a plan of the same with the top plate removed.

Similar letters of reference indicate corresponding parts.

In the drawings, A represents a closed casing, which is made of sheet metal or other suitable material, and which forms the evaporating-chamber for the substance to be distilled. At the bottom of the evaporating-chamber A is arranged a tank, B, to which the mash or other liquid from which the alcohol or other volatile substance which is to be distilled is conducted by a supply-pipe, $b$, that passes through the wall of the casing A to the outside and to the source of supply.

The casing A is heated by one or more vertical steam-coils, C, that extend longitudinally through the casing, or by means of a steam-jacket, or by means of any other suitable medium by which a temperature above the boiling temperature of the alcohol or other volatile substance to be distilled is produced.

In the evaporating-chamber is arranged an endless belt, D, that is stretched on two guide-rollers, D' D², of which the lower guide-roller, D', turns in bearings of the tank B, while the upper guide and driving-roller, D², is supported in bearings at the upper part of the casing A, the shaft of the said roller extending through a stuffing-box to the outside of the casing, so as to receive rotary motion by a belt and pulley transmission. At one or both sides of the casing A are arranged condensers E, which are made in sections of hemispherical or other shape, and connected by cylindrical tubes E', of equal diameter with the casing.

Instead of having one large condensing-surface on one side of the chamber, a series of smaller chambers are provided, on the surface of each of which condensation takes place. This has the advantage that in case any part of the condenser is damaged it can be easily removed and replaced by another. Furthermore, as said sections can be made hemispherical, a greater condensing-surface can be obtained than if the condenser consisted of one single large surface.

The condenser-sections E are inclosed by a jacket, E², to which water or other cooling medium is supplied by a pipe, $d$, and conveyed off by an overflow-pipe, $d'$. In the lower parts of the condenser-sections are arranged openings $f$, which communicate with collecting-tubes F, so as to convey the condensed vapors to the outside.

The distillation of alcohol or other substances is carried on in the following manner: Rotary motion being imparted to the endless belt D, the same takes up the mash or other liquid to be distilled continuously and disposes it in thin sheets or layers to the action of the heat in the casing, whereby the rapid evaporation of the alcohol from the mash or other liquid is produced. The vapors are conducted to the condensers E and condensed on the cooled surface of the same, and then conducted off for further use. The successive taking up and evaporating of the mash or other liquid renders the latter gradually poorer and poorer in alcohol or other volatile substances until the limit of distillation is finally reached. The spent mash is then drawn off and a new quantity of fresh mash supplied to the tank, and so on alternately. By this means a continuous, rapid, and effective distillation and condensation of each charge is going on as the volatile substance is exposed on large surfaces to the evaporating action of the heat in the casing. In place of one evaporating-belt, a number of belts can be arranged in the interior of the casing, and also several condensers arranged in connection therewith, so that the process of evaporation and condensation can take place in a quick and effective manner.

I am aware that evaporating apparatus have been constructed with blades for exposing a larger surface of liquid to the atmosphere, that such apparatus have also been constructed with belts for the same purpose, and that sheets of fabric have been used for exposing the liquid to the atmosphere.

I am aware that heretofore condensing and distilling apparatus have been constructed with an endless belt, which was dipped into the liquid, said liquid being then distilled or evaporated on the face of the belt and the vapors carried off by the air through which the moistened belt moves. The advantage of my improved device is that the vapors arising from the moisture on the belt are not carried off by the air, but are condensed, whereby the liquid is regained. I am also aware that endless belts have been used for evaporating sirups and viscous substances; but in these also the vapors were carried off and not condensed as in my apparatus; I am also aware that evaporating apparatus have been constructed with a series of blades, upon which the liquid to be condensed was dropped, for the purpose of increasing the evaporating-surface; I am also aware that liquids have been dropped over coiled pipes for the purpose of evaporating them; but all of these old constructions cannot accomplish what is accomplished by my improved device, for the reason that they do not condense the vapors and collect them in the manner set forth in the description of my device.

Having thus described my invention, I claim as new and desire to secure by Letters Patent—

1. In an apparatus, substantially as herein shown and described, for distilling alcohol, the combination, with a casing having a series of tubes in one side, of condenser-sections connected with the outer ends of the tubes, a cooling water-jacket surrounding the condenser-sections, a tank in the casing, a heater for heating the interior of the casing, and an endless belt in the casing, which belt dips in the tank, substantially as shown and described.

2. In an apparatus for distilling alcohol, the combination, with a casing, of a series of tubes in one side of the same, condenser-sections connected with the outer ends of the tubes, a cooling water-jacket surrounding the condenser-sections, a collecting-pipe in communication with openings in the bottom of the several condenser-sections, a tube for conducting water into the water-jacket and out of the same, a tank in the casing, a tube for conducting the liquid to be distilled into the said tank, a heater in the casing, and an endless belt in the casing, which endless belt dips into the tank, substantially as shown and described.

In testimony that I claim the foregoing as my invention I have signed my name in presence of two subscribing witnesses.

GEORGE JORDAN.

Witnesses:
PAUL GOEPEL,
CARL KARP.